(12) United States Patent
Uehata et al.

(10) Patent No.: US 12,151,406 B2
(45) Date of Patent: Nov. 26, 2024

(54) MOLD RELEASE AGENT

(71) Applicant: DAIKIN INDUSTRIES, LTD., Osaka (JP)

(72) Inventors: Hidekazu Uehata, Osaka (JP); Yasushi Nakamae, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 672 days.

(21) Appl. No.: 17/388,441

(22) Filed: Jul. 29, 2021

(65) Prior Publication Data

US 2021/0354338 A1  Nov. 18, 2021

Related U.S. Application Data

(63) Continuation of application No. PCT/JP2020/002163, filed on Jan. 22, 2020.

(30) Foreign Application Priority Data

Jan. 31, 2019 (JP) ................................ 2019-016198
Jun. 12, 2019 (JP) ................................ 2019-109879

(51) Int. Cl.
 *B29C 33/60* (2006.01)
(52) U.S. Cl.
 CPC .................... *B29C 33/60* (2013.01)
(58) Field of Classification Search
 CPC . B29C 33/60; C10M 169/044; C10M 173/02; C10M 2201/02; C10M 2209/084; C10M 2215/042; C10M 2223/049; C10M 2229/041; C10M 2040/36; C10M 137/04; C10M 129/70; C10M 139/04; C10M 145/24; C10M 155/02; C10M 2229/02; C10M 2229/046
 See application file for complete search history.

(56) References Cited

U.S. PATENT DOCUMENTS

| | | | |
|---|---|---|---|
| 2004/0151915 A1 | 8/2004 | Kitahara et al. |
| 2011/0139387 A1 | 6/2011 | Balbo Block et al. |
| 2014/0077418 A1 | 3/2014 | Otani et al. |
| 2015/0259509 A1 | 9/2015 | Kitahara et al. |

FOREIGN PATENT DOCUMENTS

| | | |
|---|---|---|
| CN | 104583250 A | 4/2015 |
| EP | 1 988 110 A1 | 11/2008 |
| EP | 2 636 501 A1 | 9/2013 |
| EP | 2 958 724 A1 | 12/2015 |
| JP | 7-292383 A | 11/1995 |
| JP | 2002-348348 A | 12/2002 |
| JP | 2011-121367 A | 6/2011 |
| KR | 10-2013-0069877 A | 6/2013 |
| WO | 2014/130312 A1 | 8/2014 |

OTHER PUBLICATIONS

International Preliminary Report on Patentability issued Jul. 27, 2021 in International Application No. PCT/JP2020/002163.
Extended European Search Report issued Sep. 22, 2022 in counterpart European Application No. 20748059.1.
International search report for PCT/JP 2020/002163 dated Apr. 21, 2020.

*Primary Examiner* — Anthony J Green
(74) *Attorney, Agent, or Firm* — Sughrue Mion, PLLC

(57) ABSTRACT

A mold release agent containing a component (A), at least one compound selected from a phosphoric acid ester compound represented by formula (I)

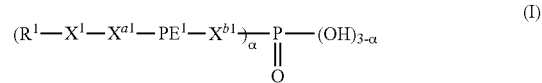

as described herein and a salt thereof.

21 Claims, No Drawings

MOLD RELEASE AGENT

CROSS REFERENCE TO RELATED APPLICATIONS

This application is a Rule 53(b) Continuation of International Application No. PCT/JP2020/002163 filed Jan. 22, 2020, claiming priority based on Japanese Patent Application Nos. 2019-016198 filed Jan. 31, 2019 and 2019-109879 filed Jun. 12, 2019, the respective disclosures of which are incorporated herein by reference in their entirety.

TECHNICAL FIELD

The present disclosure relates to a mold release agent.

BACKGROUND ART

In molding a synthetic resin, rubber, or the like, a mold release agent is applied to the inner surface of the mold (metal mold) in advance to ensure good releasability between the synthetic resin, rubber, or the like after molding and the mold (for example, Patent Literature 1).

CITATION LIST

Patent Literature

Patent Literature 1
  Japanese Patent Laid-Open No. 2011-121367

SUMMARY

A mold release agent comprising a component (A): at least one compound selected from a phosphoric acid ester compound represented by formula (I):

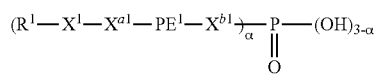

wherein
  $R^1$ each independently at each occurrence represents a hydrogen atom or a monovalent organic group;
  $X^1$ is each independently at each occurrence a single bond, an oxygen atom, a group represented by —$NR^3$—, or a divalent organic group;
  $R^3$ is a hydrogen atom or an alkyl group having 1 to 20 carbon atoms;
  $X^{a1}$ is each independently at each occurrence a single bond or an oxygen atom;
  $PE^1$ is each independently at each occurrence a group represented by the following formula:

x is each independently an integer of 1 to 6 for each unit enclosed in parentheses with n1;
  n1 is each independently at each occurrence in a range of 1 to 20;
  $X^{b1}$ is each independently at each occurrence a single bond or an alkylene group having 1 to 6 carbon atoms; and
  α is 1 or 2,
and a salt thereof.

Effect

According to the present disclosure, a mold release agent that can exhibit good releasability can be obtained.

DESCRIPTION OF EMBODIMENTS

In the present specification, the "organic group" refers to a group having a carbon atom. Examples of the organic group include, but are not limited to, a hydrocarbon group.

The "hydrocarbon group" refers to a group including carbon and hydrogen, formed by eliminating one hydrogen atom from a hydrocarbon. Examples of such a hydrocarbon group include, but are not limited to, a hydrocarbon group having 1 to 25 carbon atoms, such as an aliphatic hydrocarbon group and an aromatic hydrocarbon group, that is optionally substituted with one or more substituents. The above "aliphatic hydrocarbon group" may be either linear, branched, or cyclic, and may be either saturated or unsaturated. Also, the hydrocarbon group may include one or more ring structures. Note that such a hydrocarbon group may have one or more N, O, S, Si, amide, sulfonyl, siloxane, carbonyl, carbonyloxy, or the like at a terminal or in the molecular chain thereof.

As used in the present specification, examples of the substituent of the "hydrocarbon group" include, but are not limited to, for example, one or more groups selected from a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5- to 10-membered heterocyclyl group, a 5- to 10-membered unsaturated heterocyclyl group, a $C_{6-10}$ aryl group, and a 5- to 10-membered heteroaryl group, all of which are optionally substituted with one or more halogen atoms.

As used in the present specification, the alkyl group and the phenyl group may be unsubstituted or may be substituted unless otherwise noted. Examples of the substituent of such groups include, are not limited to, for example, one or more groups selected from a halogen atom, a $C_{1-6}$ alkyl group, a $C_{2-6}$ alkenyl group, and a $C_{2-6}$ alkynyl group.

The mold release agent of the present disclosure comprises
  a component (A): at least one compound (hereinafter, may be referred to as a "component (A)") selected from a phosphoric acid ester compound represented by formula (I):

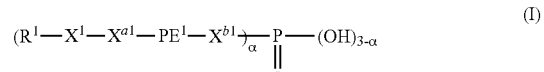

and a salt thereof.

The component (A) is at least one compound selected from a phosphoric acid ester compound represented by formula (I):

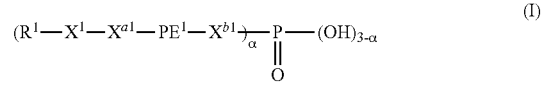

and a salt thereof. When the mold release agent of the present disclosure comprises the component (A), it improves releasability between the mold (metal mold) and the molded article molded by using that mold. This is thought to be due to the fact that the mold release agent of the present disclosure comprises the component (A), which is a phosphoric acid ester compound, which results in good adhesiveness with the metal mold (metal).

In formula (I), $R^1$ each independently at each occurrence represents a hydrogen atom or a monovalent organic group.

$R^1$ is preferably a hydrocarbon group having 1 to 25 carbon atoms, and is more preferably an aliphatic hydrocarbon group having 1 to 25 carbon atoms.

In one embodiment, $R^1$ is preferably an alkyl group having 1 to 25 carbon atoms. When $R^1$ is too long, it may cause fouling of the mold (metal mold) or may increase the transfer of the mold release agent component to the molded article molded by using that mold. In such a case, the molded article may have a poor appearance.

$R^1$ more preferably has 4 or more carbon atoms, and further preferably has 8 or more carbon atoms. $R^1$ more preferably has 20 or less carbon atoms, and may have 16 or less carbon atoms.

In a preferable embodiment, $R^1$ is more preferably an alkyl group having 4 to 20 carbon atoms, and is further preferably an alkyl group having 8 to 16 carbon atoms. Such $R^1$ is advantageous in that the mold release agent can achieve better releasability.

$R^1$ is preferably an alkyl group that has no substituent. $R^1$ may be linear, or may be branched.

Specific examples of $R^1$ may include an octyl group, a nonyl group, a decyl group, an undecyl group, a dodecyl group, a tridecyl group, a tetradecyl group, a pentadecyl group, a hexadecyl group, a heptadecyl group, an octadecyl group, and the like, and it may be a dodecyl group.

In formula (I), $X^1$ is each independently at each occurrence a single bond, an oxygen atom, a group represented by —$NR^3$—, or a divalent organic group. Here, $R^3$ is a hydrogen atom or an alkyl group having 1 to 20 carbon atoms, and is preferably a hydrogen atom. Note that the group listed as $X^1$ is bonded to the group represented by $R^1$ on the left side and to the group represented by $X^{a1}$ on the right side.

In $X^1$, examples of the divalent organic group may include, for example, an alkylene group having 1 to 20 carbon atoms, —$(CH_2)_n$—C(=O)—$(CH_2)_n$— (wherein n is each independently at each occurrence an integer of 0 to 10, and is preferably an integer of 1 to 5), and the like.

$X^1$ is preferably an oxygen atom or a group represented by —$NR^3$— (here, $R^3$ is as defined above), and is more preferably an oxygen atom.

$PE^1$ is each independently at each occurrence a group represented by the following formula:

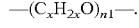

—$(C_xH_{2x}O)_{n1}$—.

The group represented by $PE^1$ is bonded to the group represented by $X^{a1}$ on the left side and to the group represented by $X^{b1}$ on the right side, respectively.

In formula (I), n1 is each independently at each occurrence in the range of 1 to 20, is preferably in the range of 1 to 10, and may be in the range of 1 to 7. When the mold release agent comprises the component (A) having such n1, it can achieve good releasability.

In one embodiment, n1 may be in the range of 2 to 7, or may be in the range of 4 to 6.

x is each independently an integer of 1 to 6 for each unit enclosed in parentheses with n1.

In one embodiment, x is each independently preferably an integer of 1 to 4, is more preferably an integer of 2 to 4, and is particularly preferably 2 for each unit enclosed in parentheses with n1.

In a preferable embodiment, $PE^1$ is a group represented by the following formula:

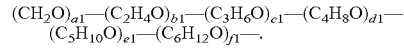

$(CH_2O)_{a1}$—$(C_2H_4O)_{b1}$—$(C_3H_6O)_{c1}$—$(C_4H_8O)_{d1}$—
$(C_5H_{10}O)_{e1}$—$(C_6H_{12}O)_{f1}$—.

In the above formula, a1, c1, d1, e1, and f1 are each independently at each occurrence preferably an integer of 0 to 20, and more preferably an integer of 0 to 10; and b1 is each independently at each occurrence preferably an integer of 0 to 20, is more preferably an integer of 1 to 20, and is further preferably an integer of 1 to 10.

The sum of a1, b1, c1, d1, e1, and f1 corresponds to n1. The order of existence of each repeating unit enclosed in parentheses with the subscript a1, b1, c1, d1, e1, or f1 is arbitrary in the formula.

In one embodiment, b1 may be in the range of 1 to 7, or may be in the range of 2 to 7.

In the above embodiment, the percentage of b1 relative to the sum of a1, b1, c1, d1, e1, and f1 is preferably 5% or more, is more preferably 20% or more, may be 30% or more, may be 40% or more, may be 50% or more, may be 70% or more, and may be 80% or more. The upper limit of the above percentage is, for example, 100%. The percentage of b1 relative to the sum of a1, b1, c1, d1, e1, and f1 may be in the range of 5% to 100%, or may be in the range of 20% to 100%.

In one embodiment, the percentage of b1 relative to the sum of a1, b1, c1, d1, e1, and f1 may be in the range of 70% to 100%, or may be in the range of 80% to 100%.

In a preferable embodiment, $PE^1$ is a group represented by the following formula:

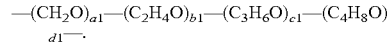

—$(CH_2O)_{a1}$—$(C_2H_4O)_{b1}$—$(C_3H_6O)_{c1}$—$(C_4H_8O)_{d1}$—.

In the above formula, a1, c1, and d1 are each independently at each occurrence preferably an integer of 0 to 20, and more preferably an integer of 0 to 10; and b1 is each independently at each occurrence preferably an integer of 0 to 20, is more preferably an integer of 1 to 20, and is further preferably an integer of 1 to 10.

Note that the sum of a1, b1, c1, and d1 corresponds to n1. The order of existence of each repeating unit enclosed in parentheses with the subscript a1, b1, c1, or d1 is arbitrary in the formula.

In one embodiment, b1 may be in the range of 1 to 7, or may be in the range of 2 to 7.

In the above embodiment, the percentage of b1 relative to the sum of a1, b1, c1, and d1 is preferably 5% or more, is more preferably 20% or more, may be 30% or more, may be 40% or more, may be 50% or more, may be 70% or more, and may be 80% or more. The upper limit of the above percentage is, for example, 100%. The percentage of b1 relative to the sum of a1, b1, c1, and d1 may be in the range of 5% to 100%, or may be in the range of 20% to 100%.

In one embodiment, the percentage of b1 relative to the sum of a1, b1, c1, and d1 may be in the range of 70% to 100%, or may be in the range of 80% to 100%.

In another preferable embodiment, PE' is a group represented by the following formula:

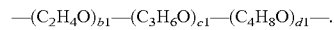

—$(C_2H_4O)_{b1}$—$(C_3H_6O)_{c1}$—$(C_4H_8O)_{d1}$—.

In the formula, b1, c1, and d1 are each independently at each occurrence preferably an integer of 0 to 20, and more preferably an integer of 1 to 10; and b1 is each independently at each occurrence preferably an integer of 0 to 20, is more preferably an integer of 1 to 20, and is further preferably an integer of 1 to 10.

The sum of b1, c1, and d1 corresponds to n1. The order of existence of each repeating unit enclosed in parentheses with the subscript b1, c1, or d1 is arbitrary in the formula.

In one embodiment, b1 may be in the range of 1 to 7, or may be in the range of 2 to 7.

In the above embodiment, the percentage of b1 relative to the sum of b1, c1, and d1 is preferably 5% or more, is more preferably 20% or more, may be 30% or more, may be 40% or more, may be 50% or more, may be 70% or more, and may be 80% or more. The upper limit of the above percentage is, for example, 100%. The percentage of b1 relative to the sum of b1, c1, and d1 may be in the range of 5% to 100%, or may be in the range of 20% to 100%.

In one embodiment, the percentage of b1 relative to the sum of b1, c1, and d1 may be in the range of 70% to 100%, or may be in the range of 80% to 100%.

In a preferable embodiment, $PE^1$ is a group represented by $-(C_2H_4O)_{b1}-$. b1 is in the range of 1 to 20, is preferably 1 or more, and is more preferably 2 or more; and is preferably 20 or less, is more preferably 15 or less, may be 10 or less, and may be 7 or less. b1 may be in the range of 1 to 10, may be in the range of 1 to 7, may be in the range of 2 to 7, or may be, for example, 4 to 6.

In formula (I), the number average molecular weight of the group represented by $R^1-X^1-X^{a1}-PE^1-X^{b1}-$ may be in the range of 350 to 10,000, or may be in the range of 350 to 5,000. The number average molecular weight of the compound represented by the above formula (I) can be measured by using gel permeation chromatography (GPC).

In one embodiment, the number average molecular weight of the group represented by $R^1-X^1-X^{a1}-PE^1-X^{b1}-$ in formula (I) may be in the range of 350 to 1,000, or may be in the range of 350 to 500.

In formula (I), the ratio of the number average molecular weights of the group represented by $R^1$ and the group represented by $PE^1$ may be in the range of 1:1 to 1:100, or may be in the range of 1:100 to 100:1.

In one embodiment, the ratio of the molecular weights of the group represented by $R^1$ and the group represented by $PE^1$ in formula (I) may be in the range of 1:10 to 10:1, may be in the range of 1:5 to 5:1, may be in the range of 1:1 to 1:2, or may be in the range of 1:1 to 1:1.5.

$X^{a1}$ is each independently at each occurrence a single bond or an oxygen atom.

In one embodiment, $X^{a1}$ is a single bond.

In one embodiment, $X^{a1}$ is an oxygen atom.

$X^{b1}$ is each independently at each occurrence a single bond or an alkylene group having 1 to 6 carbon atoms. Although such an alkylene group is not limited, it is optionally substituted with one or more substituents. Here, examples of substituent include, but are not limited to, for example, one or more groups and the like selected from a halogen atom, a $C_{1-6}$ alkyl group, a $C_{2-6}$ alkenyl group, and a $C_{2-6}$ alkynyl group.

In one embodiment, the above alkylene group is unsubstituted.

In one embodiment, $X^{b1}$ is a single bond.

In one embodiment, $X^{b1}$ is an alkylene group having 1 to 6 carbon atoms, and may be, for example, an alkylene group having 1 to 4 carbon atoms.

In one embodiment, $X^{a1}$ and $X^{b1}$ are each a single bond.

In formula (I), $\alpha$ is 1 or 2. In other words, the phosphoric acid ester compound represented by formula (I) is a phosphoric acid monoester compound wherein $\alpha$ is 1 or a phosphoric acid diester compound wherein $\alpha$ is 2.

Specific examples of the phosphoric acid ester compound represented by formula (I) may include polyoxyethylene dodecyl ether phosphoric acid monoester, polyoxyethylene dodecyl ether phosphoric acid diester, and the like wherein n1 is 3.

Examples of the salt of the phosphoric acid ester compound represented by formula (I) include, for example, a metal salt, an amine salt, an ammonium salt, a sulfonic acid salt, and a carboxylic acid salt. Examples of the metal salt include an alkali metal salt, an alkaline earth metal salt, and the like. Specific examples of the metal atom that forms the metal salt may include Li, Na, K, Mg, Ca, and the like. Among these, Na and K are preferable. Examples of the amine compound or ammonia that forms the amine salt or ammonium salt may include ammonia, monoethanolamine, dimethylamine, and the like.

The above salt of the phosphoric acid ester compound is preferably an amine salt. Examples of the amine salt may include a monoethanolamine salt, a dimethylamine salt, and the like. When an amine salt is used as the salt of the phosphoric acid ester compound, adhesion of the layer formed from the mold release agent to the mold can be particularly good.

The component (A) is at least one compound selected from a phosphoric acid monoester, a phosphoric acid diester, and a salt thereof. The component (A) may include one of the compounds mentioned above alone, or may be a mixture including two or more of them.

In one embodiment, the component (A) is a mixture of a compound wherein $\alpha$ is 1 and/or a salt thereof, and a compound wherein $\alpha$ is 2 and/or a salt thereof. That is, in the present embodiment, the component (A) includes a phosphoric acid monoester and/or a salt thereof, and a phosphoric acid diester and/or a salt thereof.

In the present embodiment, the content rate of the compound wherein $\alpha$ is 1 and a salt thereof and the compound wherein $\alpha$ is 2 and a salt thereof in the component (A) is preferably in the range of 20:80 to 80:20, and is more preferably in the range of 40:60 to 60:40, at a molar ratio. When the mold release agent of the present disclosure comprises the component (A) having such a content rate, its releasability can be made good.

In one embodiment, the component (A) is preferably in the form of salt. In the present embodiment, the component (A) preferably includes a salt of phosphoric acid monoester and a salt of phosphoric acid diester, and is more preferably a salt of phosphoric acid monoester and a salt of phosphoric acid diester.

The component (A) is preferably included in 1 part by mass or more relative to 100 parts by mass of the mold release agent of the present disclosure; and is preferably included in 90 parts by mass or less, is more preferably included in 80 parts by mass or less, is further preferably included in 70 parts by mass or less, may be included in 50 parts by mass or less, may be included in 30 parts by mass or less, may be included in 20 parts by mass or less, and may be included in 10 parts by mass or less.

The component (A) may be included in the range of 1 to 90 parts by mass relative to 100 parts by mass of the mold release agent of the present disclosure, may be included in the range of 1 to 70 parts by mass, may be included in the range of 1 to 50 parts by mass, may be included in the range of 1 to 30 parts by mass, or may be included in the range of 1 to 20 parts by mass.

In one embodiment, the component (A) may be included in the range of 1 to 10 parts by mass relative to 100 parts by mass of the mold release agent of the present disclosure, or may be included in the range of 1 to 5 parts by mass.

As the component (A), commercial products may be used.

In one embodiment, the mold release agent of the present disclosure comprises, in addition to the component (A), a compound represented by the following formula (II):

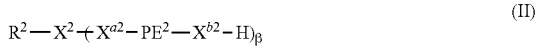
(II)

as a component (B1). When the mold release agent of the present disclosure comprises the component (B1), its stability, for example, storage stability is improved. When the mold release agent of the present disclosure comprises the component (B1), for example, it is less likely to form agglomerates when stored, thereby improving the stability and the appearance characteristics of the product. In the mold release agent of the present disclosure, the component (B1) is thought to act as a surfactant.

In formula (II), $R^2$ each independently at each occurrence represents a hydrogen atom or a monovalent organic group.

$R^2$ is preferably an alkyl group having 1 or more carbon atoms, is preferably an alkyl group having 5 or more carbon atoms, and is more preferably an alkyl group having 10 or more carbon atoms. $R^2$ is preferably an alkyl group having 50 or less carbon atoms, is more preferably an alkyl group having 30 or less carbon atoms, and is further preferably an alkyl group having 20 or less carbon atoms.

$R^2$ may be an alkyl group having 1 to 50 carbon atoms, may be an alkyl group having 5 to 30 carbon atoms, may be an alkyl group having 10 to 20 carbon atoms, or may be an alkyl group having 15 to 20 carbon atoms.

The component (B1) having such $R^2$ can exhibit the effect as a surfactant. When the number of carbon atoms in $R^2$ becomes too small, it may not be possible to obtain sufficient releasability. When the number of carbon atoms becomes too large, fouling of the metal mold or transfer to the molded article may be increased, resulting in poor appearance of the molded article.

$R^2$ is preferably an alkyl group that has no substituent.

Specific examples of $R^2$ may include a decyl group, an undecyl group, a dodecyl group, a tridecyl group, a tetradecyl group, a pentadecyl group, a hexadecyl group, a heptadecyl group, an octadecyl group, a nonadecyl group, an icosyl group, and the like, and more specifically, it may be an octadecyl group.

In formula (II), $X^2$ is each independently at each occurrence a single bond, an oxygen atom, a nitrogen atom, or a group represented by —$NR^3$—. Here, $R^3$ is a hydrogen atom or an alkyl group having 1 to 20 carbon atoms, and is preferably a hydrogen atom. For example, when $X^2$ is a single bond, formula (II) is represented by $R^2$—$(CH_2CH_2O)_{n2}$—H; when $X^2$ is an oxygen atom, formula (II) is represented by $R^2$—O—$(CH_2CH_2O)_{n2}$—H; and when $X^2$ is a nitrogen atom, formula (II) is represented by $R^2$—N—$((CH_2CH_2O)_{n2}$—H$)_2$.

$X^2$ is preferably a nitrogen atom.

In formula (II), β is an integer of 1 to 2. β can be a numerical value that is smaller than the valence of $X^2$ by 1. β may be, for example, 2.

$PE^2$ is each independently at each occurrence a group represented by the following formula:

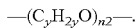

The group represented by $PE^2$ is bonded to the group represented by $X^{a2}$ on the left side and to the group represented by $X^{b2}$ on the right side, respectively.

In formula (II), n2 is each independently an integer that satisfies the number average molecular weight of the compound represented by formula (II) being 250 or more. n2 is specifically in the range of 2 to 30, and the lower limit value of n2 may be 5 or more and the upper limit value thereof may be 20 or less. Preferably, n2 is in the range of 5 to 20. When the component (B1) has such n2, it can contribute to improvement in the stability of the mold release agent. The component (B1) having n2 as described above can contribute to good storage stability of the mold release agent, especially when an aqueous medium is used as a liquid medium, which will be mentioned later.

In one embodiment, the range of n2 may be in the range of, for example, 5 to 15, may be in the range of 7 to 13, or may be in the range of, for example, 9 to 11.

In one embodiment, y is each independently preferably an integer of 1 to 4, is more preferably an integer of 2 to 4, and is particularly preferably 2 for each unit enclosed in parentheses with n2.

In a preferable embodiment, $PE^2$ is a group represented by the following formula:

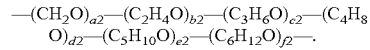

The group represented by $PE^2$ is bonded to the group represented by $X^{a2}$ on the left side and to the group represented by $X^{b2}$ on the right side, respectively.

In the above formula, a2, c2, d2, e2, and f2 are each independently at each occurrence preferably an integer of 0 to 20, and more preferably an integer of 1 to 20; and b2 is each independently at each occurrence preferably an integer of 0 to 20, is more preferably an integer of 1 to 20, and is further preferably an integer of 2 to 15.

Note that the sum of a2, b2, c2, d2, e2, and f2 corresponds to n2. The order of existence of each repeating unit enclosed in parentheses with the subscript a2, b2, c2, d2, e2, or f2 is arbitrary in the formula.

In one embodiment, b2 may be in the range of 5 to 15, or may be in the range of 7 to 13.

In the above embodiment, the percentage of b2 relative to the sum of a2, b2, c2, d2, e2, and f2 is preferably 5% or more, is more preferably 20% or more, may be 30% or more, may be 40% or more, may be 50% or more, may be 70% or more, and may be 80% or more. The upper limit of the above percentage is, for example, 100%. The percentage of b2 relative to the sum of a2, b2, c2, d2, e2, and f2 may be in the range of 5% to 100%, or may be in the range of 20% to 100%.

In one embodiment, the percentage of b2 relative to the sum of a2, b2, c2, d2, e2, and f2 may be in the range of 70% to 100%, or may be in the range of 80% to 100%.

In $PE^2$, although the structure of repeating units may be linear or may have a branched structure, it is preferably linear. For example, ($C_2H_4O$) may be any of —($CH_2CH_2O$)— and —($CH(CH_3)O$)—, but it is preferably —($CH_2CH_2O$)—. For example, ($C_3H_6O$) may be any of —($CH_2CH_2CH_2O$)—, —($CH(CH_3)CH_2O$)—, ($CH_2CH(CH_3)O$)—, and —($CH(C_2H_5)O$)—, but it is preferably —($CH_2CH_2CH_2O$)—. For example, —($C_4H_8O$)— may be any of —($CH_2CH_2CH_2CH_2O$)—, —($CH(CH_3)CH_2CH_2O$)—, —($CH_2CH(CH_3)CH_2O$)—, ($CH_2CH_2CH(CH_3)O$)—, —($CH(CH_3)$ $CH(CH_3)O$)—, —($CH(C_2H_5)$ $CH_2O)$—, $(CH_2CH(C_2H_5)O)$—, and —$CH(C_3H_6)O)$—, but it is preferably —$(CH_2CH_2CH_2CH_2O)$—.

In a preferable embodiment, $PE^2$ is a group represented by the following formula:

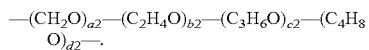

In the above formula,
a2, c2, and d2 are each independently at each occurrence preferably an integer of 0 to 20, and more preferably an integer of 1 to 10; and
b2 is each independently at each occurrence preferably an integer of 0 to 20, is more preferably an integer of 1 to 20, may be an integer of 1 to 15, and may be an integer of 2 to 15.

Note that the sum of a2, b2, c2, and d2 corresponds to n2. The order of existence of each repeating unit enclosed in parentheses with the subscript a2, b2, c2, or d2 is arbitrary in the formula.

In one embodiment, b2 may be in the range of 5 to 15, or may be in the range of 7 to 13.

In the above embodiment, the percentage of b2 relative to the sum of a2, b2, c2, and d2 is preferably 5% or more, is more preferably 20% or more, may be 30% or more, may be 40% or more, may be 50% or more, may be 70% or more, and may be 80% or more. The upper limit of the above percentage is, for example, 100%. The percentage of b2 relative to the sum of a2, b2, c2, and d2 may be in the range of 5% to 100%, or may be in the range of 20% to 100%.

In one embodiment, the percentage of b2 relative to the sum of a2, b2, c2, and d2 may be in the range of 70% to 100%, or may be in the range of 80% to 100%.

In a preferable embodiment, $PE^2$ is a group represented by the following formula:

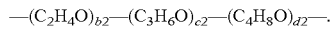

In the formula,
a2, c2, and d2 are each independently at each occurrence preferably an integer of 0 to 20, and more preferably an integer of 1 to 10; and
b2 is each independently at each occurrence preferably an integer of 0 to 20, is more preferably an integer of 1 to 20, may be an integer of 1 to 15, and may be an integer of 1 to 10.

Note that the sum of b2, c2, and d2 corresponds to n2. The order of existence of each repeating unit enclosed in parentheses with the subscript b2, c2, or d2 is arbitrary in the formula.

In one embodiment, b2 may be in the range of 5 to 15, or may be in the range of 7 to 13.

In the above embodiment, the percentage of b2 relative to the sum of b2, c2, and d2 is preferably 5% or more, is more preferably 20% or more, may be 30% or more, may be 40% or more, may be 50% or more, may be 70% or more, and may be 80% or more. The upper limit of the above percentage is, for example, 100%. The percentage of b2 relative to the sum of b2, c2, and d2 may be in the range of 5% to 100%, or may be in the range of 20% to 100%.

In one embodiment, the percentage of b2 relative to the sum of b2, c2, and d2 may be in the range of 70% to 100%, or may be in the range of 80% to 100%.

In a preferable embodiment, $PE^2$ is a group represented by —$(C_2H_4O)_{b2}$—. b2 is in the range of 1 to 20, is preferably 1 or more, and is more preferably 2 or more; and is preferably 20 or less, and is more preferably 15 or less. b2 may be in the range of 1 to 15, or may be in the range of 2 to 15.

In one embodiment, b2 may be in the range of 5 to 15, may be in the range of 7 to 13, or may be in the range of, for example, 9 to 11.

y is each independently an integer of 1 to 6 for each unit enclosed in parentheses with n2.

$X^{a2}$ is each independently at each occurrence a single bond or an oxygen atom.

In one embodiment, $X^{a2}$ is a single bond.
In one embodiment, $X^{a2}$ is an oxygen atom.
$X^{b2}$ is each independently at each occurrence a single bond or an alkylene group having 1 to 6 carbon atoms.

Although such an alkylene group is not limited, it is optionally substituted with one or more substituents. Here, examples of the substituent include, but are not limited to, for example, one or more groups and the like selected from a halogen atom, a $C_{1-6}$ alkyl group, a $C_{2-6}$ alkenyl group, and a $C_{2-6}$ alkynyl group.

In one embodiment, the above alkylene group is unsubstituted.

In one embodiment, $X^{b2}$ is a single bond.
In one embodiment, $X^{b2}$ is an alkylene group having 1 to 6 carbon atoms, and may be, for example, an alkylene group having 1 to 4 carbon atoms.

In one embodiment, $X^{a2}$ and $X^{b2}$ are each a single bond.

The number average molecular weight of the compound represented by formula (II) is 250 or more, is preferably 300 or more, and is more preferably 500 or more. The number average molecular weight of the compound represented by the above formula (II) may be 50,000 or less, or may be 10,000 or less. The number average molecular weight of the compound represented by the above formula (II) may be, for example, in the range of 250 to 50,000, or may be in the range of 250 to 10,000. The number average molecular weight of the compound represented by formula (II) can be measured by using GPC.

In formula (II), the molecular weight of $R^2$ and the molecular weight of the group represented by $PE^2$ (when there are multiple groups represented by $PE^2$, the total molecular weight of the groups represented by $PE^2$) may be in the range of 20:80 to 80:20, or may be in the range of 20:80 to 40:60.

In one embodiment, the molecular weight of $R^2$ and the molecular weight of the group represented by $PE^2$ (when there are multiple groups represented by $PE^2$, the total molecular weight of the groups represented by $PE^2$) in formula (II) may be in the range of 15:85 to 40:60, or may be in the range of 15:85 to 30:70.

Examples of the compound represented by formula (II) may include compounds with n2 being 1 to 15, specifically, compounds with n2 being 2 to 15, such as polyoxyethylene dodecyl amine, polyoxyethylene octadecyl amine, and polyoxyethylene stearyl amine.

In a preferable embodiment, β is 2 and $X^2$ is a nitrogen atom in formula (II). In the present embodiment, the compound represented by formula (II) is represented by the following formula (II'). In the formula, $R^2$, $X^{a2}$, $PE^2$, $X^{b2}$, and n2 are as defined above.

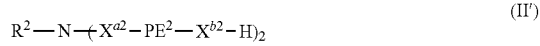

In formula (II'), particularly preferably, $R^2$ is an octadecyl group and n2 is in the range of 5 to 20.

The component (B1) may include one of the compounds mentioned above alone, or may be a mixture including two or more of them.

As the component (B1), commercial products may be used.

In the present embodiment, the mold release agent of the present disclosure comprises the above component (A) and the component (B1). When the mold release agent of the present disclosure comprises the component (A) and the component (B1), it exhibits better releasability, and furthermore, has better stability (especially, storage stability).

Specific examples of the above storage stability may include storage stability at a low temperature (for example, −5 to 5° C.) and storage stability at a high temperature (for example, 40 to 60° C.)

The mold release agent of the present disclosure preferably comprises 15 to 40 parts by mass of the component (A) relative to 100 parts by mass of the total amount of the component (A) and the component (B1). The component (A) is more preferably included in the mold release agent of the present disclosure in 17 parts by mass or more relative to 100 parts by mass of the total amount of the component (A) and the component (B1), and is further preferably included in 20 parts by mass or more; and is more preferably included in 36 parts by mass or less, is further preferably included in 30 parts by mass or less, is particularly preferably included in 27 parts by mass or less, may be included in less than 27 parts by mass, and may be included in 26 parts by mass or less. When the mold release agent of the present disclosure comprises the component (A) in the range as described above, its releasability and stability are made better, and especially, the storage stability at a low temperature can be made good.

The component (A) and the component (B1) are preferably included in the mold release agent of the present disclosure in 1 part by mass or more relative to 100 parts by mass of the mold release agent, are more preferably included in 5 parts by mass or more, and are further preferably included in 10 parts by mass or more; and are preferably included in 90 parts by mass or less, are more preferably included in 80 parts by mass or less, and are further preferably included in 70 parts by mass or less.

The component (A) and the component (B1) may be included in the mold release agent of the present disclosure in the range of 1 to 90 parts by mass relative to 100 parts by mass of the mold release agent, may be included in the range of 5 to 80 parts by mass, or may be included in the range of 10 to 70 parts by mass.

In one embodiment, the mold release agent of the present disclosure further comprises, in addition to the component (A), a silicone resin as a component (B2). When the mold release agent of the present disclosure comprises a silicone resin of the component (B2), its stability, for example, storage stability and the appearance characteristics of the product are improved. When the mold release agent of the present disclosure comprises the component (B2), for example, it is less likely to form agglomerates when stored.

The above silicone resin refers to a resin in which the main chain has a siloxane bond.

In a preferable embodiment, the above silicone resin is polyorganosiloxane having, as the main constituent, at least one structure selected from the group consisting of a trifunctional unit siloxane represented by the following formula (V) and a tetrafunctional unit siloxane represented by the following formula (VI). Note that the term "as the main constituent" indicates an embodiment in which a $SiR^{11}O_{3/2}$ unit as the trifunctional unit siloxane and a $SiO_2$ unit as the tetrafunctional unit siloxane are contained in the molecule in an amount greater than 50 mol % in total, preferably in 70 mol % or more, and more preferably in 90 mol % or more.

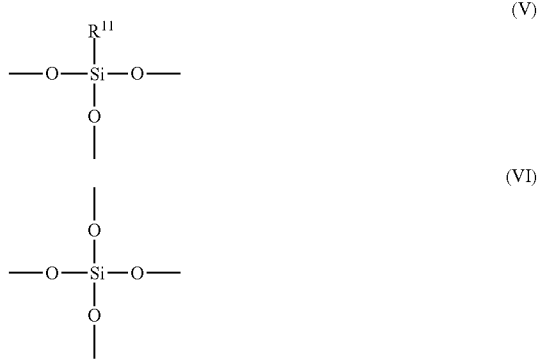

Here, in the above formula (V), $R^{11}$ represents any of a chain or cyclic alkyl group having 1 to 12 carbon atoms (for example, a methyl group, an ethyl group, a propyl group, a butyl group, a pentyl group, a nonyl group, a decyl group, a dodecyl group, an octadecyl group, a cyclohexyl group, and the like), an aromatic group (for example, a phenyl group and the like), and an alkenyl group (for example, a vinyl group and the like). For the above, multiple kinds may be included in one molecule.

In a preferable embodiment, the above silicone resin can be polyorganosiloxane having, as the main constituent, a tetrafunctional unit siloxane represented by the above formula (VI).

In a preferable embodiment, the above silicone resin can be a so-called MQ resin, wherein the tetrafunctional unit represented by formula (VI) is the Q unit and the monofunctional unit represented by formula (VII) is the M unit. Such a MQ resin is cured by a dehydration condensation reaction.

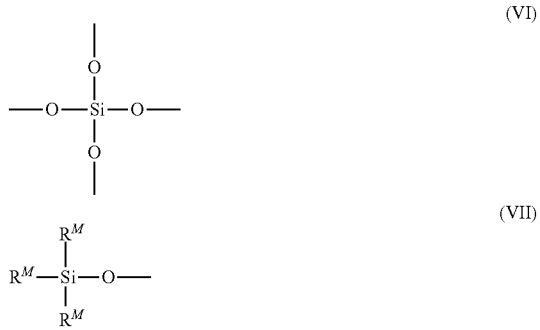

[In the formula, $R^M$ is each independently at each occurrence an alkyl group having 1 to 3 carbon atoms, a phenyl group, or a hydroxyl group.]

As the silicone resin as described above, those produced by conventionally known methods can be used, or ready-made products can be used as they are. Examples of the ready-made product may include, for example, CRA92 (trade name) manufactured by Wacker Asahikasei Silicone Co., Ltd.; BY22-736EX, BY22-749SR, SM7001EX, and SM7002EX (trade names) manufactured by Dow Corning Toray Co., Ltd.; and the like.

The number average molecular weight of the above silicone resin is 250 or more, is preferably 300 or more, and is more preferably 500 or more. The number average molecular weight of the above silicone resin may be 50,000 or less, or may be 10,000 or less. The number average molecular weight of the above silicone resin may be, for example, in the range of 250 to 50,000, or may be in the range of 250 to 10,000, for example, in the range of 1,000 to 5,000 or 2,000 to 3,000. The number average molecular weight of the above silicone resin can be measured by using GPC.

The mold release agent of the present embodiment preferably comprises 15 to 80 parts by mass of the component (A) relative to 100 parts by mass of the total amount of the component (A) and the component (B2). The component (A) is more preferably included in the mold release agent of the present embodiment in 20 parts by mass or more relative to 100 parts by mass of the total amount of the component (A) and the component (B2), is further preferably included in 30 parts by mass or more, may be included in 40 parts by mass or more, and may be included in 50 parts by mass or more; and is more preferably included in 60 parts by mass or less, is further preferably included in 50 parts by mass or less, may be included in 40 parts by mass or less, and may be included in 30 parts by mass or less. When the mold release agent of the present embodiment comprises the component (A) and the component (B2) in the range as described above, its releasability and stability are made better.

The component (A) and the component (B2) are preferably included in the mold release agent of the present embodiment in 1 part by mass or more relative to 100 parts by mass of the mold release agent, are more preferably included in 5 parts by mass or more, and are further preferably included in 10 parts by mass or more; and are preferably included in 90 parts by mass or less, are more preferably included in 80 parts by mass or less, are further preferably included in 70 parts by mass or less, and may be 60 parts by mass or less or 50 parts by mass or less.

In the present embodiment, the component (A) and the component (B2) may be included in the mold release agent of the present embodiment in the range of 1 to 90 parts by mass relative to 100 parts by mass of the mold release agent, may be included in the range of 5 to 80 parts by mass, or may be included in the range of 10 to 70 parts by mass.

In one embodiment, the mold release agent of the present disclosure further comprises, in addition to the component (A), a silicone oil as a component (B3). When the mold release agent of the present disclosure comprises a silicone oil of the component (B3), its stability, for example, storage stability and the appearance characteristics of the product are improved. When the mold release agent of the present disclosure comprises the component (B3), for example, it is less likely to form agglomerates when stored.

The above silicone oil refers to a non-reactive silicone oil that has no reactive group, such as an alkoxy group or a silanol group, in the molecule.

The above silicone oil may be, for example, either linear or cyclic silicone oil. The above linear silicone oil may be a so-called straight silicone oil or modified silicone oil. Examples of the straight silicone oil include dimethyl silicone oil, methyl phenyl silicone oil, and methyl hydrogen silicone oil. Examples of the modified silicone oil include those obtained by modifying a straight silicone oil with an alkyl, aralkyl, polyether, higher fatty acid ester, fluoroalkyl, amino, epoxy, carboxyl, alcohol, or the like. Examples of the cyclic silicone oil include, for example, cyclic dimethyl siloxane oil.

In a preferable embodiment, the above silicone oil is polydimethylsiloxane in which the molecular chain ends are blocked with triorganosiloxy groups, such as trimethylsiloxy groups.

The number average molecular weight of the above silicone oil is 500 or more, is preferably 1,000 or more, and is more preferably 1,500 or more. The number average molecular weight of the above silicone oil may be 100,000 or less, or may be 50,000 or less or 10,000 or less. The number average molecular weight of the above silicone oil may be, for example, in the range of 500 to 100,000, or may be in the range of 1,000 to 50,000, for example, in the range of 1,500 to 10,000, 2,000 to 6,000, or 4,000 to 5,000. The number average molecular weight of the above silicone oil can be measured by using GPC.

The mold release agent of the present embodiment preferably comprises 15 to 80 parts by mass of the component (A) relative to 100 parts by mass of the total amount of the component (A) and the component (B3). The component (A) is more preferably included in the mold release agent of the present embodiment in 20 parts by mass or more relative to 100 parts by mass of the total amount of the component (A) and the component (B3), is further preferably included in 30 parts by mass or more, may be included in 40 parts by mass or more, and may be included in 50 parts by mass or more; and is more preferably included in 60 parts by mass or less, is further preferably included in 50 parts by mass or less, may be included in 40 parts by mass or less, and may be included in 30 parts by mass or less. When the mold release agent of the present embodiment comprises the component (A) and the component (B3) in the range as described above, its releasability and stability are made better.

The component (A) and the component (B3) are preferably included in the mold release agent of the present embodiment in 1 part by mass or more relative to 100 parts by mass of the mold release agent, are more preferably included in 5 parts by mass or more, and are further preferably included in 10 parts by mass or more; and are preferably included in 90 parts by mass or less, are more preferably included in 80 parts by mass or less, are further preferably included in 70 parts by mass or less, and may be 60 parts by mass or less or 50 parts by mass or less.

In the present embodiment, the component (A) and the component (B3) may be included in the mold release agent of the present embodiment in the range of 1 to 90 parts by mass relative to 100 parts by mass of the mold release agent, may be included in the range of 5 to 80 parts by mass, or may be included in the range of 10 to 70 parts by mass.

In one embodiment, the mold release agent of the present disclosure further comprises a silicone oil as a component (B3). When the mold release agent of the present disclosure comprises a silicone oil of the component (B3), its stability, for example, storage stability is improved. When the mold release agent of the present disclosure comprises the component (B3), for example, it is less likely to form agglomerates when stored.

In one embodiment, the mold release agent of the present disclosure comprises the component (A), the component (B2), and the component (B3).

The mold release agent of the present embodiment preferably comprises 15 to 80 parts by mass of the component (A) relative to 100 parts by mass of the total amount of the component (A), the component (B2), and the component (B3). The component (A) is more preferably included in the mold release agent of the present embodiment in 20 parts by mass or more relative to 100 parts by mass of the total amount of the component (A) and the component (B3), is further preferably included in 30 parts by mass or more, may be included in 40 parts by mass or more, and may be included in 50 parts by mass or more; and is more preferably included in 60 parts by mass or less, is further preferably included in 50 parts by mass or less, may be included in 40 parts by mass or less, and may be included in 30 parts by mass or less. When the mold release agent of the present embodiment comprises the component (A) in the range as described above, its releasability and stability are made better.

The component (A), the component (B2), and the component (B3) are preferably included in the mold release agent of the present embodiment in 1 part by mass or more relative to 100 parts by mass of the mold release agent, are more preferably included in 5 parts by mass or more, and are further preferably included in 10 parts by mass or more; and are preferably included in 90 parts by mass or less, are more preferably included in 80 parts by mass or less, are further preferably included in 70 parts by mass or less, and may be 60 parts by mass or less or 50 parts by mass or less.

In the present embodiment, the component (A), the component (B2), and the component (B3) may be included in the mold release agent of the present embodiment in the range of 1 to 90 parts by mass relative to 100 parts by mass of the mold release agent, may be included in the range of 5 to 80 parts by mass, or may be included in the range of 10 to 70 parts by mass.

In the present embodiment, the ratio between the component (B2) and the component (B3) may be preferably 1:10 to 10:1, more preferably 1:5 to 5:1, further preferably 1:3 to 3:1, and particularly preferably 1:2 to 2:1.

In a preferable embodiment, the mold release agent of the present disclosure further comprises, in addition to the mold release agent of the above embodiment, a polymer having a constituent unit derived from a compound represented by formula (III):

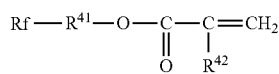

(III)

as a component (C). That is, the mold release agent of the present embodiment may be a mold release agent comprising the component (A) and the component (C), a mold release agent comprising the component (A), the component (B1), and the component (C), or a mold release agent comprising the component (A), at least one of the component (B2) and the component (B3), and the component (C). The compound represented by the above formula (III) may be used singly, or may be used in combination of multiple kinds. When the mold release agent of the present disclosure comprises the component (C), the appearance of the molded article formed by using the mold release agent can be made good.

In formula (III), Rf is each independently at each occurrence a linear or branched fluoroalkyl group or fluoroalkenyl group having 1 to 10 carbon atoms. The above fluoroalkyl group is preferably a perfluoroalkyl group, and the fluoroalkenyl group is preferably a perfluoroalkenyl group.

The number of carbon atoms in Rf is preferably 1 to 8, is preferably 4 to 8, and may be 6.

Rf is preferably a perfluoroalkyl group or perfluoroalkenyl group having 1 to 10 carbon atoms, is more preferably a perfluoroalkyl group or perfluoroalkenyl group having 1 to 8 carbon atoms, and is further preferably a perfluoroalkyl group or perfluoroalkenyl group having 4 to 8 carbon atoms.

Examples of the fluoroalkyl group may include, for example, $-CF_3$, $CF_2CF_3$, $-CF_2CF_2CF_3$, $-CF(CF_3)_2$, $CF_2CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $-CF(CF_3)CF_2CF_3$, $-(CF_2)_8CF_3$, $-(CF_2)_3CF(CF_3)_2$, $-(CF_2)_6CF_3$, $(CF_2)_7CF_3$, $-(CF_2)_8CF_3$, $-(CF_2)_9CF_3$, and the like.

Examples of the fluoroalkenyl group may include, for example, $-CF=CF_2$, $-CF_2CF=CF_2$, $-(CF_2)_2CF=CF_2$, $-CF_2C(CF_3)=CF_2$, $-CF(CF_3)CF=CF_2$, $-(CF_2)_3CF=CF_2$, $-C(CF_3)_2CF=CF_2$, $-(CF_2)_2C(CF_3)=CF_2$, $-(CF_2)_4CF=CF_2$, $-(CF_2)_4CF=CF_2$, $-(CF_2)_3C(CF_3)=CF_2$, $-(CF_2)_5CF=CF_2$, $-(CF_2)_6CF=CF_2$, $-(CF_2)_7CF=CF_2$, $-(CF_2)_8CF=CF_2$, and the like.

In one embodiment, Rf is preferably a fluoroalkyl group, and is more preferably a perfluoroalkyl group.

In one embodiment, Rf is preferably a fluoroalkenyl group, and is more preferably a perfluoroalkenyl group.

In formula (III), $R^{41}$ is each independently at each occurrence a divalent organic group. $R^{41}$ is preferably a linear or branched divalent aliphatic hydrocarbon group or a divalent aromatic hydrocarbon group.

$R^{41}$ is preferably a linear or branched divalent aliphatic hydrocarbon group having 1 to 30 carbon atoms (for example, a linear or branched divalent aliphatic hydrocarbon group having 1 to 10 carbon atoms, and specifically, an alkylene group or the like having 1 to 10 carbon atoms) or a divalent aromatic hydrocarbon group having 6 to 12 carbon atoms (for example, an aromatic hydrocarbon group having 6 to 10 carbon atoms). When the divalent aliphatic hydrocarbon group includes a ring structure, the number of carbon atoms constituting $R^{41}$ is more preferably 6 to 12, and is more preferably 6 to 10.

Specific examples of the alkylene group having 1 to 10 carbon atoms include a methylene group, an ethylene group, a trimethylene group, a 2-methylethylene group, a hexylene group, an octylene group, and the like.

Among the alkylene group having 1 to 10 carbon atoms, an alkylene group having 1 to 6 carbon atoms is preferable, an alkylene group having 1 to 4 carbon atoms is more preferable, and an alkylene group having 1 to 2 carbon atoms is further preferable.

When the aliphatic hydrocarbon group includes a ring structure, examples of such a group include, but are not limited to, for example, a 1,4-cyclohexylene group, a 1,4-bismethylenecyclohexylene group, a 1,4-bisethylenecyclohexylene group, and the like.

Examples of the divalent aromatic hydrocarbon group having 6 to 10 carbon atoms include, but are not limited to, for example, a 1,4-phenylene group, a 1,4-bismethylenephenylene group, a 1,4-bisethylenephenylene group, and the like.

The above divalent aliphatic hydrocarbon group may be, for example, a group represented by $-CH_2CH_2N(R^{51})SO_2-$, wherein $R^{51}$ is an alkyl group having 1 to 4 carbon atoms, or a group represented by $-CH_2CH(OR^{52})CH_2-$, wherein $R^{52}$ is a hydrogen atom or an acetyl group.

In formula (III), $R^{42}$ is each independently at each occurrence a hydrogen atom or a methyl group.

Specific examples of the compound represented by the above formula (III) include the following:

$CF_3(CF_2)_3-CH_2-O-C(=O)CH=CH_2$,
$CF_3(CF_2)_5-CH_2-O-C(=O)CH=CH_2$,
$CF_3CF_2-(CH_2)_2-O-C(=O)CH=CH_2$,
$CF_3(CF_2)_2-(CH_2)_2-O-C(=O)CH=CH_2$,
$CF_3(CF_2)_3-(CH_2)_2-O-C(=O)CH=CH_2$, $CF_3(CF_2)_5$—$(CH_2)_2$—O—C(=O)CH=$CH_2$,
$CF_3(CF_2)_2$—$CH_2$—O—C(=O)C($CH_3$)=$CH_2$,
$CF_3(CF_2)_3$—$CH_2$—O—C(=O)C($CH_3$)=$CH_2$,
$CF_3(CF_2)_5$—$CH_2$—O—C(=O)C($CH_3$)=$CH_2$,
$CF_3(CF_2)_3$—$(CH_2)_2$—O—C(=O)C($CH_3$)=$CH_2$,
$CF_3(CF_2)_5$—$(CH_2)_2$—O—C(=O)C($CH_3$)=$CH_2$,
$CF_3(CF_2)_3$—$SO_2$—N($CH_3$)($CH_2$)$_2$—O—C(=O)CH=$CH_2$,
$CF_3(CF_2)_3$—$SO_2$—N($C_2H_5$)($CH_2$)$_2$—O—C(=O)C($CH_3$)=$CH_2$,
$(CF_3)_2CF(CF_2)_3$—$CH_2$CH(OCOC$H_3$)$CH_2$—O—C(=O)—C($CH_3$)=$CH_2$,
$(CF_3)_2CF(CF_2)_3$—$CH_2$CH(OH)$CH_2$—O—C(=O)—CH=$CH_2$

Among the above, the compound represented by the above formula (III) is preferably any of the following:
$CF_3(CF_2)_5$—$CH_2$—O—C(=O)CH=$CH_2$,
$CF_3(CF_2)_5$—$(CH_2)_2$—O—C(=O)CH=$CH_2$,
$CF_3(CF_2)_5$—$CH_2$—O—C(=O)C($CH_3$)=$CH_2$,
$CF_3(CF_2)_5$—$(CH_2)_2$—O—C(=O)C($CH_3$)=$CH_2$ The above polymer may further comprise a constituent unit derived from a non-fluorine (meth)acrylic acid ester. The above non-fluorine (meth)acrylic acid ester is represented by, for example, the following formula (IV).

In the above formula, $R^{61}$ is a monovalent organic group, is preferably a linear or branched monovalent aliphatic hydrocarbon group or a monovalent aromatic hydrocarbon group, and is more preferably a linear or branched monovalent aliphatic hydrocarbon group having 1 to 30 carbon atoms (for example, an alkyl group having 1 to 30 carbon atoms, and specifically, an alkyl group having 1 to 22 carbon atoms) or an aromatic hydrocarbon group having 6 to 12 carbon atoms. When the above aliphatic hydrocarbon group has a ring structure, the number of carbon atoms constituting $R^{61}$ is preferably 6 to 10.

Examples of the alkyl group having 1 to 22 carbon atoms include, for example, a methyl group, an ethyl group, a n-propyl group, an i-propyl group, a n-butyl group, an i-butyl group, a s-butyl group, a t-butyl group, a n-pentyl group, a neopentyl group, a t-pentyl group, a n-hexyl group, a 2-ethylbutyl group, a n-heptyl group, a n-octyl group, a 2-ethylhexyl group, a nonyl group, a decyl group, a dodecyl group, a tridecyl group, a tetradecyl group, a cetyl group, a stearyl group, a behenyl group, and the like. Examples of the monovalent aromatic hydrocarbon group having 6 to 12 carbon atoms include a phenyl group, a 2-ethylphenyl group, an indenyl group, a toluyl group, a benzyl group, and the like. When the aliphatic hydrocarbon group has a ring structure, examples of such a group include a cyclohexyl group, a norbornyl group, a norbornylmethyl group, an isobornyl group, a bornyl group, a menthyl group, an octahydroindenyl group, an adamantyl group, a dimethyladamantyl group, and the like.

In the above formula, $R^{62}$ is each independently at each occurrence a hydrogen atom or a methyl group.

Specific examples of the compound represented by the above formula (IV) include methyl (meth)acrylate, ethyl (meth)acrylate, n-propyl (meth)acrylate, i-propyl (meth)acrylate, n-butyl (meth)acrylate, i-butyl (meth)acrylate, s-butyl (meth)acrylate, t-butyl (meth)acrylate, n-pentyl (meth)acrylate, neopentyl (meth)acrylate, t-pentyl (meth)acrylate, n-hexyl (meth)acrylate, 2-ethylbutyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, tridecyl (meth)acrylate, tetradecyl (meth)acrylate, cetyl (meth)acrylate, stearyl (meth)acrylate, behenyl (meth)acrylate, norbornyl (meth)acrylate, norbornylmethyl (meth)acrylate, isobornyl (meth)acrylate, bornyl (meth)acrylate, menthyl (meth)acrylate, octahydroindenyl (meth)acrylate, adamantyl (meth)acrylate, dimethyladamantyl (meth)acrylate, phenyl (meth)acrylate, 2-ethylphenyl (meth)acrylate, indenyl (meth)acrylate, toluyl (meth)acrylate, benzyl (meth)acrylate, and the like. Among these, it is preferable to use stearyl acrylate and/or behenyl acrylate as the compound represented by formula (IV).

The compound represented by the above formula (IV) may be used singly, or may be used in combination of multiple kinds.

The above polymer may further comprise a constituent unit derived from a chain transfer agent. Examples of the chain transfer agent may include, for example, lauryl mercaptan, glycidyl mercaptan, mercaptoacetic acid, 2-mercaptoethanol, 2-ethylhexyl thioglycolate, 2,3-dimercapto-1-propanol, and the like. Among these, it is preferable to use lauryl mercaptan.

The compound represented by the above chain transfer agent may be used singly, or may be used in combination of multiple kinds.

The polymer of the component (C) is preferably a polymer comprising 5 to 95 parts by mass of the constituent unit derived from the compound represented by the above formula (III), 5 to 95 parts by mass of the constituent unit derived from the compound represented by the above formula (IV), and 0.01 to 5 parts by mass of the constituent unit derived from the above chain transfer agent, relative to 100 parts by mass of the total of the constituent unit derived from the compound represented by the above formula (III) and the constituent unit derived from the compound represented by the above formula (IV); and is more preferably a polymer comprising 10 to 95 parts by mass of the constituent unit derived from the compound represented by the above formula (III), 5 to 90 parts by mass of the constituent unit derived from the compound represented by the above formula (IV), and 0.05 to 0.5 parts by mass of the constituent unit derived from the above chain transfer agent.

In one embodiment, the polymer of the component (C) may be a polymer comprising 80 to 95 parts by mass of the constituent unit derived from the compound represented by the above formula (III), 5 to 20 parts by mass of the constituent unit derived from the compound represented by the above formula (IV), and 0.01 to 5 parts by mass of the constituent unit derived from the above chain transfer agent, relative to 100 parts by mass of the total of the constituent unit derived from the compound represented by the above formula (III) and the constituent unit derived from the compound represented by the above formula (IV); or may be a polymer comprising 85 to 95 parts by mass of the constituent unit derived from the compound represented by the above formula (III), 5 to 15 parts by mass of the constituent unit derived from the compound represented by the above formula (IV), and 0.05 to 0.5 parts by mass of the constituent unit derived from the above chain transfer agent.

In a preferable embodiment, the compound represented by formula (III) is
$CF_3(CF_2)_5$—$CH_2$—O—C(=O)CH=$CH_2$,
$CF_3(CF_2)_5$—$(CH_2)_2$—O—C(=O)CH=$CH_2$, $CF_3(CF_2)_5$—$CH_2$—O—C(=O)C($CH_3$)=$CH_2$, or
$CF_3(CF_2)_5$—$(CH_2)_2$—O—C(=O)C($CH_3$)=$CH_2$;
    the compound represented by formula (IV) is stearyl acrylate; and
    the chain transfer agent is lauryl mercaptan.

In a more preferable embodiment, the compound represented by formula (III) is
$CF_3(CF_2)_5$—$(CH_2)_2$—O—C(=O)C($CH_3$)=$CH_2$;
    the compound represented by formula (IV) is stearyl acrylate; and
    the chain transfer agent is lauryl mercaptan.

The number average molecular weight of the above polymer is not limited, and it may be, for example, in the range of 10,000 to 100,000, or may be in the range of 5,000 to 200,000. The number average molecular weight can be measured by GPC.

The fluorine content in the above polymers is, for example, in the range of 10 to 80% by mass, and in the range of 30 to 60% by mass.

The decomposition temperature of the above polymer is, for example, in the range of 160 to 200° C., and in the range of 230 to 250° C. The decomposition temperature can be measured by using a thermogravimetric differential thermal analyzer (TG/DTA).

The above polymer can be synthesized by known methods. For example, it may be synthesized by emulsion polymerization or may be synthesized by solution polymerization.

Emulsion polymerization can be carried out as follows, for example, with no limitations. In the presence of a polymerization initiator and an emulsifier, various monomers are emulsified in water, and after nitrogen purging, the mixture is stirred and copolymerized in the range of 50 to 80° C. for 1 to 10 hours.

In the emulsion polymerization, examples of the polymerization initiator include, but are not limited to, for example, water-soluble polymerization initiators, such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate, and ammonium persulfate; and oil-soluble polymerization initiators, such as azobisisobutyronitrile, benzoyl peroxide, di-t-butyl peroxide, lauryl peroxide, cumen hydroperoxide, t-butyl peroxypivalate, diisopropyl peroxydicarbonate, and azobismethylpropionate.

In the emulsion polymerization, the polymerization initiator can usually be added in the range of 0.01 to 10 parts by weight relative to 100 parts by weight of the monomers.

In the emulsion polymerization, in order to obtain a copolymer water dispersion liquid that has excellent stability even when left to stand, it is preferable to make fine particles of the monomers in water by using an emulsification apparatus that is capable of imparting strong crushing energy, such as a high pressure homogenizer and an ultrasonic homogenizer, and to polymerize them using an oil-soluble polymerization initiator.

In the emulsion polymerization, various anionic, cationic or nonionic emulsifiers can be used as the emulsifier. The emulsifier can usually be used in the range of 0.5 to 20 parts by weight relative to 100 parts by weight of the monomers. As the emulsifier, it is preferable to use a nonionic emulsifier or an anionic emulsifier.

Examples of the nonionic emulsifier include, but are not limited to, for example, polyoxyethylene alkyl ether, sorbitan alkylate, sorbitan alkyl ester, and the like. Examples of the polyoxyethylene alkyl ether may include, but are not limited to, for example, polyoxyethylene lauryl ether and the like.

Examples of the anionic emulsifier may include alkyl sulfuric acid salts, alkyl sulfonic acid salts, alkyl phosphoric acid esters, and the like. Examples of the alkyl sulfuric acid ester may include, but are not limited to, sodium alkyl sulfate and the like.

Examples of the cationic emulsifier may include quaternary ammonium salts, alkyl amine salts, and the like. Examples of the quaternary ammonium salt may include, but are not limited to, lauryl trimethyl ammonium chloride and the like.

In the emulsion polymerization, when the monomers are not completely compatible, it is preferable to add a compatibilizer that makes these monomers sufficiently compatible, such as a water-soluble organic solvent or a low molecular weight monomer. By adding a compatibilizer, emulsifiability and copolymerizability can be improved.

Examples of the water-soluble organic solvent as the compatibilizer may include, but are not limited to, for example, acetone, methyl ethyl ketone, ethyl acetate, propylene glycol, dipropylene glycol monomethyl ether, dipropylene glycol, diethylene glycol diethyl ether, tripropylene glycol, ethanol, and the like. The water-soluble organic solvent is usually used in the range of 1 to 50 parts by weight relative to 100 parts by weight of water. The water-soluble organic solvent is preferably used in the range of 10 to 40 parts by weight relative to 100 parts by weight of water.

Solution polymerization can be carried out as follows, for example, with no limitations. In the presence of a polymerization initiator, monomers are dissolved in an organic solvent, and after nitrogen purging, the mixture is heated and stirred in the range of 30 to 120° C. for 1 to 10 hours. Examples of the polymerization initiator include, for example, azobisisobutyronitrile, benzoyl peroxide, di-t-butyl peroxide, lauryl peroxide, cumen hydroperoxide, t-butyl peroxypivalate, diisopropyl peroxydicarbonate, and the like. The polymerization initiator is usually used in the range of 0.01 to 20 parts by weight relative to 100 parts by weight of the monomers. The polymerization initiator is preferably used in the range of 0.01 to 10 parts by weight relative to 100 parts by weight of the monomers.

In the solution polymerization, the organic solvent is not limited as long as it is inert to the monomers and dissolves them. Examples of the organic solvent include, for example, acetone, chloroform, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, and the like. The organic solvent is usually used in the range of 50 to 2,000 parts by weight relative to 100 parts by weight of the monomers. The organic solvent is preferably used in the range of 50 to 1,000 parts by weight relative to 100 parts by weight of the total of the monomers.

The mold release agent of the present disclosure preferably comprises, relative to 100 parts by mass of the total of the component (A), the component (B1), the component (B2), the component (B3), and the component (C) (hereinafter, the component (B1), the component (B2), and the component (B3) may also be collectively referred to as a "component (B)), 1 to 90 parts by mass of the component (A), 1 to 90 parts by mass of the component (B), and 0 to 20 parts by mass of the component (C); more preferably comprises 5 to 80 parts by mass of the component (A), 5 to 80 parts by mass of the component (B), and 1 to 10 parts by mass of the component (C); and further comprises 10 to 70 parts by mass of the component (A), 10 to 70 parts by mass of the component (B), and 1 to 5 parts by mass of the component (C).

In one embodiment, the mold release agent of the present disclosure may comprise, relative to 100 parts by mass of the total of the component (A), the component (B), and the component (C), 10 to 45 parts by mass of the component (A), 55 to 90 parts by mass of the component (B), and 0 to 20 parts by mass of the component (C); may comprise 15 to 40 parts by mass of the component (A), 59 to 84 parts by mass of the component (B), and 1 to 10 parts by mass of the component (C); or may comprise 15 to 30 parts by mass of the component (A), 65 to 80 parts by mass of the component (B), and 3 to 7 parts by mass of the component (C).

[Liquid Medium]

The mold release agent of the present disclosure may further contain a liquid medium.

The above liquid medium may be at least one kind selected from water and organic solvents. Examples of the organic solvent may include alcohols such as ethanol, propyl alcohol, and isopropyl alcohol; ethers; and the like.

The above liquid medium may be an organic solvent alone, or may be an aqueous medium. Here, the aqueous medium refers to water alone or a mixture of water and an organic solvent. When the liquid medium is an aqueous medium, the organic solvent included in the liquid medium can be a water-miscible organic solvent. The amount of the water-miscible organic solvent may be 30 parts by mass or less, for example, 10 parts by mass or less (preferably 0.1 parts by mass or more) relative to 100 parts by mass of the liquid medium.

Examples of the water-miscible organic solvent may include, for example, alcohols such as ethanol, propyl alcohol, and isopropyl alcohol; ethers; and the like.

In one embodiment, the liquid medium is water.

The liquid medium may be included in 70 to 90 parts by mass relative to 100 parts by mass of the mold release agent, or may be included in 90 to 99 parts by mass.

[Additional Component]

The mold release agent of the present disclosure may further contain an additional component. Examples of the additional component may include an emulsifier, an additive agent, a silicone compound, a wax, and the like.

As the above emulsifier, at least one selected from nonionic emulsifiers, cationic emulsifiers, anionic emulsifiers, and amphoteric emulsifiers can be used. For the above emulsifier, a compound having a structure other than those of the compounds listed as the component (A) and the component (B) is used.

Examples of the above emulsifier may include, for example, nonionic emulsifiers such as aliphatic alcohols, ethoxylated aliphatic alcohols, ethoxylated oxoalcohols and other alcohol ethers, aliphatic amines (for example, dimethyl alkyl amine), fatty acid alkanolamides, and esters of alcohols and fatty acids including glycerol esters or polyglycerol esters or sorbitol esters; cationic surfactants such as quaternary ammonium salts and alkyl amine salts; anionic emulsifiers such as alkyl ether carboxylic acid salts, alkyl sulfate, aliphatic alcohol ethoxylate ether sulfuric acid salts, α-olefin sulfonic acid salts, alkyl phosphates, and alkyl sulfosuccinates; and amphoteric ion emulsifiers. These emulsifiers may be used singly, or may be used in combination of multiple kinds.

The above emulsifier may be included in, for example, 0.5 to 20 parts by mass, and specifically in 1 to 10 parts by mass relative to 100 parts by mass of the mold release agent of the present disclosure.

Examples of the above additive agent may include a silicon-containing compound, a wax, an acrylic emulsion, a fluorine-containing polymer, a drying rate adjuster, a cross-linking agent, a film formation agent, a compatibilizer, an antifreezing agent, a viscosity modifier, an ultraviolet light absorber, an antioxidant, a pH adjuster, an antifoaming agent, a texture modifier, a slippage modifier, an antistatic agent, a hydrophilizing agent, an antibacterial agent, a preservative, an insect repellent, a fragrant agent, a flame retarder, an alcohol (for example, 2-aminoethanol, methanol, and the like) and the like.

The above additional component may be included in, for example, 0.1 to 20 parts by mass, and specifically in 0.5 to 10 parts by mass relative to 100 parts by mass of the mold release agent of the present disclosure.

The mold release agent of the present disclosure can further comprise phosphoric acid or a salt derived therefrom. When the mold release agent of the present disclosure comprises such phosphoric acid or a salt thereof, it can achieve good releasability.

The concentration of the above phosphoric acid or a salt thereof is preferably 10 ppm by mass or less relative to 100 parts by mass of the mold release agent of the present disclosure, is preferably 1 ppm by mass or less, is more preferably 0.5 ppm by mass or less, and is further preferably 0.1 ppm by mass or less. The concentration of the above phosphoric acid or a salt thereof may be, for example, 0 to 1 ppm by mass, specifically 0 to 0.5 ppm by mass, and more specifically 0 to 0.1 ppm by mass.

The mold release agent of the present disclosure may be in the form of a solution, an emulsion, a suspension, an aerosol, or the like.

When the mold release agent of the present disclosure is in the form of an emulsion, the mold release agent preferably comprises an emulsifier as the above additional component.

When the mold release agent of the present disclosure is in the form of an aerosol, it can be filled into an aerosol can by using a propellant. Examples of the propellant include, for example, LPG, dimethyl ether, carbon dioxide, and the like. The amount of the propellant is usually 10 to 95% by weight relative to the total amount of the mold release agent and the propellant, is preferably 20 to 90% by weight, and is more preferably 30 to 90% by weight. When the amount of the propellant is 10% by weight or more, the product can be sprayed better and a more uniform layer of the mold release agent tends to be obtained. Also, when the amount of the propellant is 95% by weight or less, the layer of the mold release agent is not too thin and the releasability tends not to be reduced too much.

For the mold release agent of the present disclosure, its specific gravity at 25° C. may be in the range of 0.8 to 1.2, or may be in the range of 0.9 to 1.1. The specific gravity can be measured by using a float type specific gravimeter.

For the mold release agent of the present disclosure, its pH is preferably in the range of 8.0 to 12.0, and is more preferably in the range of 9.0 to 11.0.

The mold release agent of the present disclosure can be prepared by using methods known in the art.

The mold release agent of the present disclosure can be used as an internal mold release agent or as an external mold release agent. The mold release agent of the present disclosure is preferably used as an external mold release agent.

When the mold release agent of the present disclosure is used as an external mold release agent, it can usually be used as follows. The mold release agent is applied to the inner surface of the mold, and when the solvent or the like is included therein, after the solvent or the like is dried and removed, a layer of the mold release agent is formed on the mold. The molding composition is filled into the die to mold the molding material, and the molding material is removed from the die.

Examples of the mold for which the mold release agent of the present disclosure is used include, for example, a die made of a metal such as aluminum, SUS, and iron; a die made of an epoxy resin or made of wood; and a die that has been subjected to nickel electroforming or chrome plating; and the like.

Examples of the molding material released by utilizing the mold release agent of the present disclosure include, for example, rubbers such as urethane rubber, H-NBR (hydrogenated nitrile rubber), NBR (nitrile rubber), silicone rubber, EPDM (ethylene propylene diene rubber), CR (chloroprene rubber), NR (natural rubber), fluoroelastomer, SBR (styrene butadiene rubber), BR (butadiene rubber), IIR (isobutylene isoprene rubber), and IR (isoprene rubber); thermosetting resins such as urethane foam, epoxy resin, phenolic resin, and FRP (fiber reinforced plastic, for example, CFRP (carbon fiber reinforced plastic) and GFRP (glass fiber reinforced plastic)); thermoplastic resins such as ABS (acrylonitrile butadiene styrene copolymerization synthetic resin), polycarbonate, and PBT (polybutylene terephthalate resin); and the like.

Although the embodiments have been described above, it will be understood that diverse changes in form and details can be made without departing from the spirit and scope of the claims.

The present disclosure provides the following [1] to [21].

[1] A mold release agent comprising a component (A): at least one compound selected from a phosphoric acid ester compound represented by formula (I):

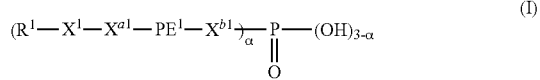

wherein
R$^1$ each independently at each occurrence represents a hydrogen atom or a monovalent organic group;
X$^1$ is each independently at each occurrence a single bond, an oxygen atom, a group represented by —NR$^3$—, or a divalent organic group;
R$^3$ is a hydrogen atom or an alkyl group having 1 to 20 carbon atoms;
X$^{a1}$ is each independently at each occurrence a single bond or an oxygen atom;
PE$^1$ is each independently at each occurrence a group represented by the following formula:

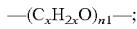

x is each independently an integer of 1 to 6 for each unit enclosed in parentheses with n1;
n1 is each independently at each occurrence in a range of 1 to 20;
X$^{b1}$ is each independently at each occurrence a single bond or an alkylene group having 1 to 6 carbon atoms; and
α is 1 or 2,
and a salt thereof.

[2] The mold release agent according to the above [1], wherein R$^1$ is a hydrocarbon group having 1 to 25 carbon atoms.

[3] The mold release agent according to the above [1] or [2], wherein X$^1$ is an oxygen atom or a group represented by —NR$^3$—, wherein R$^3$ is a hydrogen atom or an alkyl group having 1 to 20 carbon atoms.

[4] The mold release agent according to any one of the above [1] to [3], wherein x is each independently an integer of 1 to 4 for each unit enclosed in parentheses with n1.

[5] The mold release agent according to any one of the above [1] to [4], wherein X$^{a1}$ and X$^{b1}$ are a single bond.

[6] The mold release agent according to any one of the above [1] to [5], wherein the component (A) is a mixture of a salt of the compound represented by formula (I) wherein α is 1, and a salt of the compound represented by formula (I) wherein α is 2.

[7] The mold release agent according to any one of the above [1] to [6], wherein the component (A) comprises a salt of the compound represented by formula (I) wherein α is 1, and a salt of the compound represented by formula (I) wherein α is 2, at a molar ratio in a range of 20:80 to 80:20.

[8] The mold release agent according to any one of the above [1] to [7], further comprising a component (B1): at least one compound having a number average molecular weight of 250 or more and represented by formula (II):

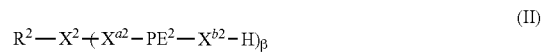

wherein
R$^2$ each independently at each occurrence represents a hydrogen atom or a monovalent organic group;
X$^2$ is each independently at each occurrence a single bond, an oxygen atom, a nitrogen atom, or a group represented by —NR$^3$—;
R$^3$ is a hydrogen atom or an alkyl group having 1 to 20 carbon atoms;
X$^{a2}$ is each independently at each occurrence a single bond or an oxygen atom;
PE$^2$ is each independently at each occurrence a group represented by the following formula:

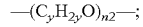

y is each independently an integer of 1 to 6 for each unit enclosed in parentheses with n2;
n2 is an integer;
X$^{b2}$ is each independently at each occurrence a single bond or an alkylene group having 1 to 6 carbon atoms; and
β is 1 or 2.

[9] The mold release agent according to the above [8], wherein R$^2$ is an alkyl group having 1 to 50 carbon atoms.

[10] The mold release agent according to the above [8] or [9], wherein X$^2$ is a nitrogen atom and β is 2.

[11] The mold release agent according to any one of the above [8] to [10], wherein y is each independently an integer of 1 to 4 for each unit enclosed in parentheses with n2.

[12] The mold release agent according to any one of the above [8] to [11], wherein n2 is in a range of 2 to 30.

[13] The mold release agent according to any one of the above [8] to [12], wherein X$^{a2}$ and X$^{b2}$ are each a single bond.

[14] The mold release agent according to any one of the above [1] to [13], further comprising a component (B2): polyorganosiloxane having, as a main constituent, at least one structure selected from the group consisting of a trifunctional unit siloxane represented by the following formula (V) and a tetrafunctional unit siloxane represented by the following formula (VI):

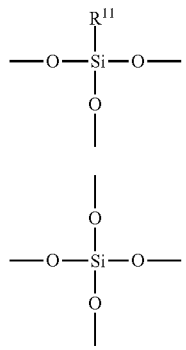

wherein $R^{11}$ is a chain or cyclic alkyl group having 1 to 12 carbon atoms.

[15] The mold release agent according to any one of the above [1] to [14], further comprising a component (B3): silicone oil.

[16] The mold release agent according to the above [15], comprising the component (A), the component (B2), and the component (B3).

[17] The mold release agent according to the above [16], comprising 15 to 80 parts by mass of the component (A) relative to 100 parts by mass of a total amount of the component (A), the component (B1), the component (B2), and the component (B3).

[18] The mold release agent according to any one of the above [1] to [17], further comprising a component (C): a polymer having a constituent unit derived from a compound represented by formula (III):

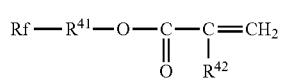

wherein
Rf is each independently at each occurrence a linear or branched fluoroalkyl group or fluoroalkenyl group having 1 to 6 carbon atoms;
$R^{41}$ is a divalent organic group; and
$R^{42}$ is each independently at each occurrence a hydrogen atom or a methyl group.

[19] The mold release agent according to the above [18], comprising 1 to 90 parts by mass of the component (A) relative to 100 parts by mass of a total amount of the component (A), the component (B1), the component (B2), the component (B3), and the component (C).

[20] The mold release agent according to the above [18], comprising 0.1 to 20 parts by mass of the component (C) relative to 100 parts by mass of a total amount of the component (A), the component (B1), the component (B2), the component (B3), and the component (C).

[21] The mold release agent according to any one of the above [18] to [20], further comprising a liquid medium.

EXAMPLES

Hereinafter, the present disclosure will be further specifically described with reference to Examples. The present disclosure is not limited to the following Examples.

The compounds used in Examples and Comparative Examples are as follows.
Component (A)
polyoxyethylene (average value of n: 5) lauryl ether phosphoric acid ester-monoethanolamine salt (monoester:diester=50:50 (molar ratio))
Component (B1)
polyoxyethylene stearyl amine $C_{18}H_{37}N((CH_2CH_2O)_nH)_2$ (average value of n: 10)
Component (B2)
MQ resin (number average molecular weight: 2,000 to 3,000)
Component (B3)
dimethylpolysiloxane (number average molecular weight: 4,000 to 5,000)
Component (C)

Synthesis Example 1

Under the following conditions, a polymer (component (C)) comprising constituent units derived from perfluoroalkyl methacrylate ($C_6F_{13}$—$CH_2CH_2O(C=O)C(CH_3)$=$CH_2$), stearyl acrylate, and lauryl mercaptan was synthesized.

Added were 45 g of perfluoroalkyl methacrylate, 5 g of stearyl acrylate, 4 g of polyoxyethylene (n=20) lauryl ether (nonionic emulsifier), 0.2 g of lauryl mercaptan, 7 g of dipropylene glycol monomethyl ether, and 95 g of ion exchanged water. The mixture was emulsified by using a high pressure homogenizer. The obtained emulsion was placed in a 300 ml four-necked flask equipped with a reflux condenser, nitrogen inlet tube, thermometer, and stirrer, and kept at 60° C. for about 1 hour under a nitrogen stream. Thereafter, 0.3 g of ammonium persulfate dissolved in 5 g of water was added as an initiator to start the polymerization. By heating and stirring the mixture at 60° C. for 3 hours, an aqueous copolymer emulsion was prepared.

The number average molecular weight of the polymer obtained by the above polymerization was about 40,000. The fluorine content in the polymer was about 50% by mass. The decomposition temperature of the polymer was about 240° C.

Note that the number average molecular weight, fluorine content, and decomposition temperature of the polymer are values obtained by the following methods, respectively.
(Number Average Molecular Weight)
By using GPC (model number: GPC-104, manufactured by Showa Denko K.K.), the number average molecular weight of the polymer was measured. The specific conditions are as follows.
Column:
sample side (total of 5 columns in series): KF-G 4A (guard column)→LF-604 (2 columns)→KF-601 (2 columns)
reference side (total of 4 columns in series): KF-600 RL (2 columns)→KF-600 RH (2 columns)
Detector: differential refractive index detector
Solution: THF (tetrahydrofuran)
Flow rate: 0.6 ml/min
A THF solution containing 0.5% by mass of the polymer was prepared, and using an automatic sampler, the prepared solution was measured by using GPC under the above conditions.
(Fluorine Content)
By using an automatic sample combustor (model number: AQF100 model, manufactured by Mitsubishi Chemical Corporation), the fluorine content was measured according to the combustion decomposition-ion chromatography measurement method.

(Decomposition Temperature)

The decomposition temperature of the polymer was measured by using a thermogravimetric differential thermal analyzer (model number: TG/DTA7200, manufactured by Hitachi High-Tech Science Corporation). Specifically, 10 mg of the cured material was weighed in an aluminum pan, and the measurement was performed using aluminum oxide powder ($Al_2O_3$) as the reference in the measurement temperature range of 25 to 600° C., at a temperature-increasing rate of 10 degrees/min, and under an air atmosphere, thereby evaluating the decomposition temperature at which the weight was reduced by 1%.

The evaluation methods in the present Examples are as follows.

[Evaluation of Releasability]

By using a mold release agent obtained in each of Examples and Comparative Examples, a molded article was fabricated as follows.

The mold release agent sample was applied to each of two aluminum plates. Then, a SMC (sheet mold compound) of an unsaturated polyester resin was sandwiched between the two aluminum plates so that it was in contact with the surfaces of the aluminum plates to which the mold release agent sample had been applied, and heated (140° C.×2 min) and pressurized (10 MPa). Thereafter, the SMC was demolded.

As described above, the mold release agent samples were applied to two aluminum plates, SMCs of the unsaturated polyester resin were sandwiched between them, and after heating (140° C.×2 min) and pressurization (10 MPa), they were demolded, and the releasability was compared according to the relative comparison method. The evaluation of releasability was judged as follows.

Evaluation "6": The releasability was good, and almost no mold release agent sample remained on the aluminum plates. This was superior to "5" according to relative comparison.

Evaluation "5": The releasability was good, but a small amount of the mold release agent sample remained on the aluminum plates. This was superior to "4" according to relative comparison.

Evaluation "4": The releasability was good, but a small amount of the mold release agent sample remained on the aluminum plates. This was superior to "3" according to relative comparison.

Evaluation "3": The releasability was good, but the amount of the mold release agent sample left on the aluminum plates was a little large. This was superior to "2" according to relative comparison.

Evaluation "2": The releasability was good, but the amount of the mold release agent sample left on the aluminum plates was a little large. This was superior to according to relative comparison.

Evaluation "1": The releasability was bad. This was inferior to "2" according to relative comparison.

[Evaluation of Stability]

Each of the mold release agents obtained in Examples and Comparative Examples was left to stand under the following low temperature conditions or high temperature conditions.

(Low Temperature Conditions)

A sample for storage stability was prepared and left to stand in an atmosphere of −5° C. for 90 days.

(High Temperature Conditions)

A sample for storage stability was prepared and left to stand in an atmosphere of 60° C. for 90 days.

(Evaluation Method)

The samples that had been left to stand under low temperature conditions or high temperature conditions were visually observed and evaluated as follows.

Evaluation "3": There was no visible sediment.

Evaluation "2": There was a small amount of sediment visually observed.

Evaluation "1": There was a large amount of sediment visually observed.

[Evaluation of Appearance of Molded Article]

The molded articles fabricated in the evaluation of releasability were evaluated for their appearances based on the following criteria.

Evaluation "3": It was visually confirmed that there was no unevenness on the surface of the molded article.

Evaluation "2": It was visually confirmed that there was a small amount of unevenness on the surface of the molded article.

Evaluation "1": It was visually confirmed that there was a large amount of unevenness on the surface of the molded article.

Examples 1 and 2

By mixing 10.0 parts by mass of the component (A) described above and 90.0 parts by mass of ion exchanged water, the mold release agent of Example 1 was prepared. Similarly, by mixing 9.0 parts by mass of the component (A) described above, 1.0 parts by mass of the component (C), and 90.0 parts by mass of ion exchanged water, the mold release agent of Example 2 was prepared. For these mold release agents, the evaluation of releasability was carried out as described above. The results were "6" for Example 1 and "5" for Example 2, and it was confirmed that the mold release agents comprising the component (A) have good releasability.

Examples 3 to 15 and Comparative Examples 1 to 5

According to the percentages described in Table 1, the component (A), the component (B1), the component (B2), the component (B3), the component (C), and ion exchanged water were mixed to prepare mold release agents comprising the component (B). Note that the values in Table 1 are given so that the total amount of the component (A), the component (B1), the component (B2), the component (B3), the component (C), and the polymer obtained in Synthesis Example 1 is 100 parts by mass. For each of the Examples and Comparative Examples, the releasability, the stability, and the appearance of the product were evaluated as described above. The results are shown in Table 2.

TABLE 1

|  | Component (A) (parts by mass) | Component (B1) (parts by mass) | Component (B2) (parts by mass) | Component (B3) (parts by mass) | Component (C) (parts by mass) | Ion exchanged water (parts by mass) |
|---|---|---|---|---|---|---|
| Example 3 | 3.6 | 6.0 | 0 | 0 | 0.4 | 90.0 |
| Example 4 | 3.0 | 6.9 | 0 | 0 | 0.1 | 90.0 |
| Example 5 | 2.7 | 7.0 | 0 | 0 | 0.3 | 90.0 |
| Example 6 | 1.8 | 8.0 | 0 | 0 | 0.2 | 90.0 |
| Example 7 | 1.5 | 8.0 | 0 | 0 | 0.5 | 90.0 |
| Example 8 | 2.0 | 8.0 | 0 | 0 | 0 | 90.0 |
| Example 9 | 2.0 | 7.9 | 0 | 0 | 0.1 | 90.0 |
| Example 10 | 2.0 | 7.5 | 0 | 0 | 0.5 | 90.0 |
| Example 11 | 2.5 | 7.0 | 0 | 0 | 0.5 | 90.0 |
| Example 12 | 1.0 | 0 | 0 | 4.0 | 0 | 95.0 |
| Example 13 | 3.0 | 0 | 0.8 | 1.2 | 0 | 95.0 |
| Example 14 | 2.0 | 0 | 1.2 | 1.8 | 0 | 95.0 |
| Example 15 | 1.0 | 0 | 1.6 | 2.4 | 0 | 95.0 |
| Comparative Example 1 | 0 | 8.0 | 0 | 0 | 2.0 | 90.0 |
| Comparative Example 2 | 0 | 10.0 | 0 | 0 | 0 | 90.0 |
| Comparative Example 3 | 0 | 0 | 5.0 | 0 | 0 | 95.0 |
| Comparative Example 4 | 0 | 0 | 0 | 5.0 | 0 | 95.0 |
| Comparative Example 5 | 0 | 0 | 2.0 | 3.0 | 0 | 95.0 |

TABLE 2

|  | Evaluation of releasability | Evaluation of stability Low temperature | Evaluation of stability High temperature | Evaluation of appearance |
|---|---|---|---|---|
| Example 3 | 3 | 2 | 1 | 2 |
| Example 4 | 4 | 2 | 3 | 2 |
| Example 5 | 3 | 2 | 3 | 2 |
| Example 6 | 3 | 3 | 3 | 2 |
| Example 7 | 2 | 3 | 3 | 2 |
| Example 8 | 5 | 3 | 3 | 2 |
| Example 9 | 3 | 3 | 3 | 2 |
| Example 10 | 5 | 3 | 3 | 3 |
| Example 11 | 6 | 2 | 3 | 3 |
| Example 12 | 3 | 3 | 3 | 2 |
| Example 13 | 5 | 1 | 2 | 3 |
| Example 14 | 5 | 1 | 2 | 2 |
| Example 15 | 6 | 3 | 3 | 2 |
| Comparative Example 1 | 1 | 3 | 1 | 1 |
| Comparative Example 2 | 1 | 1 | 3 | 1 |
| Comparative Example 3 | 1 | 3 | 3 | 1 |
| Comparative Example 4 | 2 | 3 | 3 | 1 |
| Comparative Example 5 | 3 | 3 | 3 | 1 |

INDUSTRIAL APPLICABILITY

The mold release agent of the present disclosure can be used as an internal mold release agent or as an external mold release agent. The mold release agent of the present disclosure can be used for molding various molded bodies.

The mold release agent of the present disclosure is generally in the form of a coating material. The mold release agent composition of the present disclosure can be used as a corrosion inhibitor, a desiccating agent, a waterproofing agent, a water repellent agent, and a soil resistant agent.

What is claimed is:
1. A mold release agent, comprising:
(1) a component (A), which is at least one compound selected from a phosphoric acid ester compound represented by formula (I) or a salt thereof:

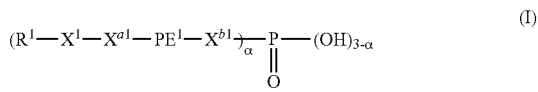

wherein, in formula (I):
$R^1$ is each independently at each occurrence a hydrogen atom or a monovalent organic group;
$X^1$ is each independently at each occurrence a single bond, an oxygen atom, a group of $-NR^3-$, or a divalent organic group;
$R^3$ is a hydrogen atom or an alkyl group having 1 to 20 carbon atoms;
$X^{a1}$ is each independently at each occurrence a single bond or an oxygen atom;

PE$^1$ is each independently at each occurrence a group of the following formula:

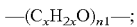
—(C$_x$H$_{2x}$O)$_{n1}$—;

x is each independently an integer of 1 to 6 for each unit in parentheses with n1;
n1 is each independently at each occurrence in a range of 1 to 20;
X$^{b1}$ is each independently at each occurrence a single bond or an alkylene group having 1 to 6 carbon atoms; and
α is 1 or 2, and
(2) at least one further component selected from the group consisting of the following components (B1), (B2), (B3), and (C):
(B1): at least one compound having a number average molecular weight of 250 or more and represented by formula (II):

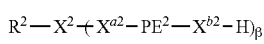
R$^2$—X$^2$—(X$^{a2}$—PE$^2$—X$^{b2}$—H)$_\beta$ (II)

wherein, in formula (II):
R$^2$ is each independently at each occurrence a hydrogen atom or a monovalent organic group;
X$^2$ is each independently at each occurrence a single bond, an oxygen atom, a nitrogen atom, or a group of by —NR$^3$—;
R$^3$ is a hydrogen atom or an alkyl group having 1 to 20 carbon atoms;
X$^{a2}$ is each independently at each occurrence a single bond or an oxygen atom;
PE$^2$ is each independently at each occurrence a group of the following formula:

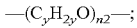
—(C$_y$H$_{2y}$O)$_{n2}$—;

y is each independently an integer of 1 to 6 for each unit in parentheses with n2;
n2 is an integer;
X$^{b2}$ is each independently at each occurrence a single bond or an alkylene group having 1 to 6 carbon atoms; and
β is 1 or 2,
(B2): a polyorganosiloxane having, as a main constituent, at least one structure selected from the group consisting of a trifunctional unit siloxane of the following formula (V) and a tetrafunctional unit siloxane of the following formula (VI):

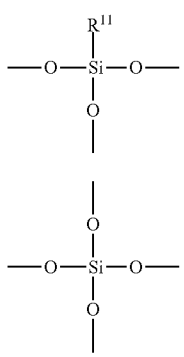

wherein, in formula (V), R$^{11}$ is a chain or cyclic alkyl group having 1 to 12 carbon atoms,
(B3) silicone oil, and
(C) a polymer having a constituent unit derived from a compound of formula (III):

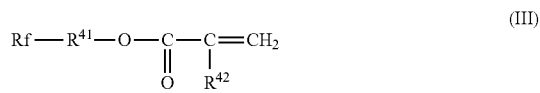

wherein, in formula (III):
Rf is each independently at each occurrence a linear or branched fluoroalkyl group or fluoroalkenyl group having 1 to 6 carbon atoms;
R$^{41}$ is a divalent organic group; and
R$^{42}$ is each independently at each occurrence a hydrogen atom or a methyl group.

2. The mold release agent according to claim 1, wherein, in formula (I), R$^1$ is a hydrocarbon group having 1 to 25 carbon atoms.

3. The mold release agent according to claim 1, wherein, in formula (I), X$^1$ is an oxygen atom or a group of —NR$^3$—, wherein R$^3$ is a hydrogen atom or an alkyl group having 1 to 20 carbon atoms.

4. The mold release agent according to claim 1, wherein, in formula (I), x is each independently an integer of 1 to 3 for each unit in parentheses with n1.

5. The mold release agent according to claim 1, wherein, in formula (I), X$^{a1}$ and X$^{b1}$ are each a single bond.

6. The mold release agent according to claim 1, wherein the component (A) is a mixture of a salt of the compound represented by formula (I) wherein α is 1, and a salt of the compound represented by formula (I) wherein α is 2.

7. The mold release agent according to claim 1, wherein the component (A) comprises a salt of the compound represented by formula (I) wherein α is 1, and a salt of the compound represented by formula (I) wherein α is 2 at a molar ratio in a range of 20:80 to 80:20.

8. The mold release agent according to claim 1, comprising the component (B1).

9. The mold release agent according to claim 8, wherein, in formula (II), R$^2$ is an alkyl group having 1 to 50 carbon atoms.

10. The mold release agent according to claim 8, wherein, in formula (II), X$^2$ is a nitrogen atom and β is 2.

11. The mold release agent according to claim 8, wherein, formula (II), y is each independently an integer of 1 to 4 for each unit in parentheses with n2.

12. The mold release agent according to claim 8, wherein, in formula (II), n2 is in a range of 2 to 30.

13. The mold release agent according to claim 8, wherein, in formula (II), X$^{a2}$ and X$^{b2}$ are each a single bond.

14. The mold release agent according to claim 1, comprising the component (B2).

15. The mold release agent according to claim 1, comprising the component (B3).

16. The mold release agent according to claim 1, comprising the component (A), the component (B2), and the component (B3).

17. The mold release agent according to claim 16, comprising 15 to 80 parts by mass of the component (A) relative to 100 parts by mass of a total amount of the component (A), the component (B1), the component (B2), and the component (B3).

18. The mold release agent according to claim 1, comprising the component (C).

19. The mold release agent according to claim 1, comprising 1 to 90 parts by mass of the component (A) relative to 100 parts by mass of a total amount of the component (A), the component (B1), the component (B2), the component (B3), and the component (C).

20. The mold release agent according to claim 18, comprising 0.1 to 20 parts by mass of the component (C) relative to 100 parts by mass of a total amount of the component (A), the component (B1), the component (B2), the component (B3), and the component (C).

21. The mold release agent according to claim 1, further comprising a liquid medium.

* * * * *